(12) United States Patent
Friedrich et al.

(10) Patent No.: US 8,761,953 B2
(45) Date of Patent: Jun. 24, 2014

(54) GRID OPTIMIZATION RESOURCE DISPATCH SCHEDULING

(71) Applicant: Innovari, Inc., Austin, TX (US)

(72) Inventors: Loran Friedrich, Portland, OR (US); Eric Pierce, Portland, OR (US); Jason Hill, Portland, OR (US); James Tillett, Portland, OR (US); Dave Walden, Long Beach, CA (US); Laura Raymond, Houston, TX (US); Chris Hickman, Austin, TX (US); Phong Do, Austin, TX (US)

(73) Assignee: Innovari, Inc., Austin, TX (US)

( * ) Notice: Subject to any disclaimer, the term of this patent is extended or adjusted under 35 U.S.C. 154(b) by 0 days.

(21) Appl. No.: 13/803,816

(22) Filed: Mar. 14, 2013

(65) Prior Publication Data

US 2013/0289772 A1 Oct. 31, 2013

Related U.S. Application Data

(60) Provisional application No. 61/640,318, filed on Apr. 30, 2012.

(51) Int. Cl.
*G05D 3/12* (2006.01)
*G05B 11/01* (2006.01)
*G06F 15/16* (2006.01)

(52) U.S. Cl.
USPC ............... 700/296; 700/19; 700/22; 700/286; 700/297; 709/201; 709/208; 709/217

(58) Field of Classification Search
USPC ............ 700/19, 22, 286, 291, 296, 297; 709/201, 208, 217
See application file for complete search history.

(56) References Cited

U.S. PATENT DOCUMENTS

| | | | |
|---|---|---|---|
| 7,373,222 B1 * | 5/2008 | Wright et al. ................. | 700/295 |
| 2004/0204772 A1 * | 10/2004 | Maturana et al. ................ | 700/2 |
| 2006/0276938 A1 | 12/2006 | Miller | |
| 2008/0177423 A1 * | 7/2008 | Brickfield et al. ............ | 700/291 |
| 2009/0062969 A1 * | 3/2009 | Chandra et al. ............... | 700/291 |
| 2009/0157529 A1 * | 6/2009 | Ehlers et al. .................... | 705/26 |
| 2012/0143385 A1 * | 6/2012 | Goldsmith .................... | 700/297 |
| 2012/0310435 A1 * | 12/2012 | Taft ............................... | 700/297 |
| 2013/0096727 A1 * | 4/2013 | Brandt et al. ................. | 700/291 |

* cited by examiner

*Primary Examiner* — Darrin Dunn
(74) *Attorney, Agent, or Firm* — Mintz Levin Cohn Ferris Glovsky and Popeo, P.C.

(57) ABSTRACT

Data comprising a request specifying a desired change in electrical load for a defined period of time is received. The electrical load is associated with a plurality of resources under control of resource agents and on a utility grid. Available capacity of resources within the control of each resource agent over the defined period of time is determined. Each available capacity is determined at least using a resource load model. Using the determined available capacity of resources over the defined period of time, resource scheduling instructions are calculated for a subset of resources. The resource scheduling instructions satisfy the desired change in electrical load of the request. Data characterizing the resource scheduling instructions is provided. Related systems, apparatus, methods, and articles are also described.

19 Claims, 12 Drawing Sheets

|  | 10 | 15 | 30 | 60 | 120 | 180 |
|---|---|---|---|---|---|---|
| GE | S/L: 9 | S/L: 9 | S/L: 9 | S/L: 9 | S/L: 9 | S/L: 9<br>HVAC: 1,2<br>HVACrule: +8 |
| high | S/L: 7,8 | S/L: 7,8 | S/L: 7,8 |  | HVAC: 1,2<br>HVACrule: +6 | HVAC: 1,2<br>HVACrule: +6 |
| med | S/L: 4,5,6 | S/L: 4,5,6 | S/L: 4,5,6 | S/L: 4,5,6<br>HVAC: 1,2<br>HVACrule: +4 | S/L: 4,5,6<br>HVAC: 1,2<br>HVACrule: +4 | S/L: 4,5,6 |
| contracted | S/L: 1,2,3<br>HVAC: 1,2,3<br>HVACrule: +2 | S/L: 1,2,3<br>HVAC: 1,2,3<br>HVACrule: +2 | S/L: 1,2,3<br>HVAC: 1,2,3<br>HVACrule: +2 | S/L: 1,2,3<br>HVAC: 1,2, "3"<br>HVACrule: +2 | S/L: 1,2,3 | S/L: 1,2,3 |
|  | \multicolumn{6}{c}{Dispatch time (minutes)} |

GRID OPTIMIZATION RESOURCE DISPATCH SCHEDULING

RELATED APPLICATIONS

This application claims priority to U.S. Provisional Application No. 61/640,318, filed on Apr. 30, 2012, the entire contents of which are hereby incorporated by reference.

TECHNICAL FIELD

The subject matter described herein relates to electrical grid resource management, including the consumption of, and its relationship to, the generation of power. Specifically scheduling algorithms, electrical load modeling, forecasting of consumption, resource organization, and interfacing with a requesting party such as a utility, market participant or others for enabling grid optimization and other services.

BACKGROUND

The total load connected to a power grid can vary significantly over time. The total load is the sum of individual choices by many consumers at any instant in time. The result is dynamic and sometimes rapidly varying load consumption pattern which must be served by resource management of the electrical grid. For example, on a hot day, millions of consumers turning on their heating, ventilation and air conditioning (HVAC) units would cause a rapid increase in the electrical load of the power grid. Traditionally, to respond to a rapid increase in power consumption, which may occur faster than the ability of a generator to start-up and serve the demand, some generators are operated in a standby mode. Operating in standby mode allows a generator to deliver power quickly, improving the reliability of the grid, but is costly, damaging to the environment, and an inefficient means to assure power can be delivered in response to consumption demands. In addition to varying loads, new varying sources of power are being added to the grid. Wind and solar generation resources only provide power to the grid when the wind is blowing or the sun is shining, so the challenge of matching supply and demand has grown in complexity and has forced many more fossil fueled power plants to be built and operated in standby mode to deal with these rapid and significant fluctuations. Intermittent resource management in an electric power grid usually relies on using the intermittent resources to displace fuel that would otherwise be consumed by non-renewable power stations. Rather than only managing the input of power to the grid, it would be very beneficial to manage the electrical loads on the grid in order to improve the efficiency, reliability, economics, and sustainability of electricity services.

SUMMARY

In one aspect, data comprising a request specifying a desired change in electrical load for a defined period of time is received. The electrical load is associated with a plurality of resources under control of resource agents and on a utility grid. Available capacity of resources within the control of each resource agent over the defined period of time is determined. Each contributor to the available capacity is determined at least using a resource load model. Using the determined available capacity of resources over the defined period of time, resource scheduling instructions are calculated for a subset of resources. The resource scheduling instructions satisfy the desired change in electrical load of the request. Data characterizing the resource scheduling instructions is provided.

One or more of the following features can be included. For example, the data characterizing the resource scheduling instructions can be provided to resource agents in control of the subset of resources. The request can be from a utility or other interested entity. The instructed resource agents can be audited for actual capacity during the defined period of time and can be provided additional instructions to satisfy the desired change in electrical load of the request. Determining available capacity can be further based on a set of deployment rules. The set of deployment rules can include one or more of: a duration a given resource may be dispatched, and a rest period of a given resource. The set of deployment rules can reflect terms that a resource manager has previously agreed to.

Resources can be switched load resources. Resources can include at least one heating, ventilation, and air conditioning (HVAC) unit, and lighting. The resource load model can predict future load requirements for the given resource. The resource load model can be dependent on one or more of time and temperature. The load model can be dynamically updated based on data describing a state of the resource. The resource load model can be based on past observations of the same or a similar resource. The resource load model can be one of linear, non-linear, or stepwise discontinuous. The capacity of each resource is determined based on a load, duration of request, frequency of resource, and duration of deployment rule. The scheduling instructions can include a precooling-phase instruction. The request can include data characterizing specific resources to be instructed. Determining available capacity of resources can be further based on at least a weather forecast.

Feedback can be received from one or more of the resource agent, a resource, a set of resources, or a user. The calculation of the subset of resources and resource scheduling instructions can be based on the received feedback. Providing data can include one of persisting, displaying, and transmitting.

Described herein are scheduling algorithms, electrical load modeling, forecasting of consumption, resource organization and interfacing with utilities and other interested parties for enabling grid load control to optimize overall grid utilization while helping to balance new intermittent renewable resources. All of these efforts lead to overall grid optimization through the provision of a variety of services. The process of controlling consumption as an alternative to, and in conjunction with, generation is herein referred to as resource management. Additionally, resource management includes the desired effects of load reduction for grid optimization, improved grid efficiency or other purposes such as phase balancing and voltage control. Resource management also enables a requesting party such as a utility, market participant or others to engage in cost effective decisions when purchasing or managing a power portfolio. Resource management may be governed by a set of deployment rules, decision trees, or other means of criteria which may be arranged in a table, matrix or array, herein called the deployment rule matrix. For example when a request for action is received from a requesting party, a resource processor, using multiple inputs and data resources, determines with algorithms, rules or calculations an available resource capacity and additional analysis such as forecasting. The resource processor may automatically or by operator instructions generate resource instructions to control loads such as HVACs, switched loads, variable loads and other distributed energy resources to affect energy consumption and satisfy the requirements of the request.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from and included by implication to the description and drawings, and from the claims.

DESCRIPTION OF DRAWINGS

Like reference symbols in the various drawings indicate like elements.

DETAILED DESCRIPTION

Figure 1:
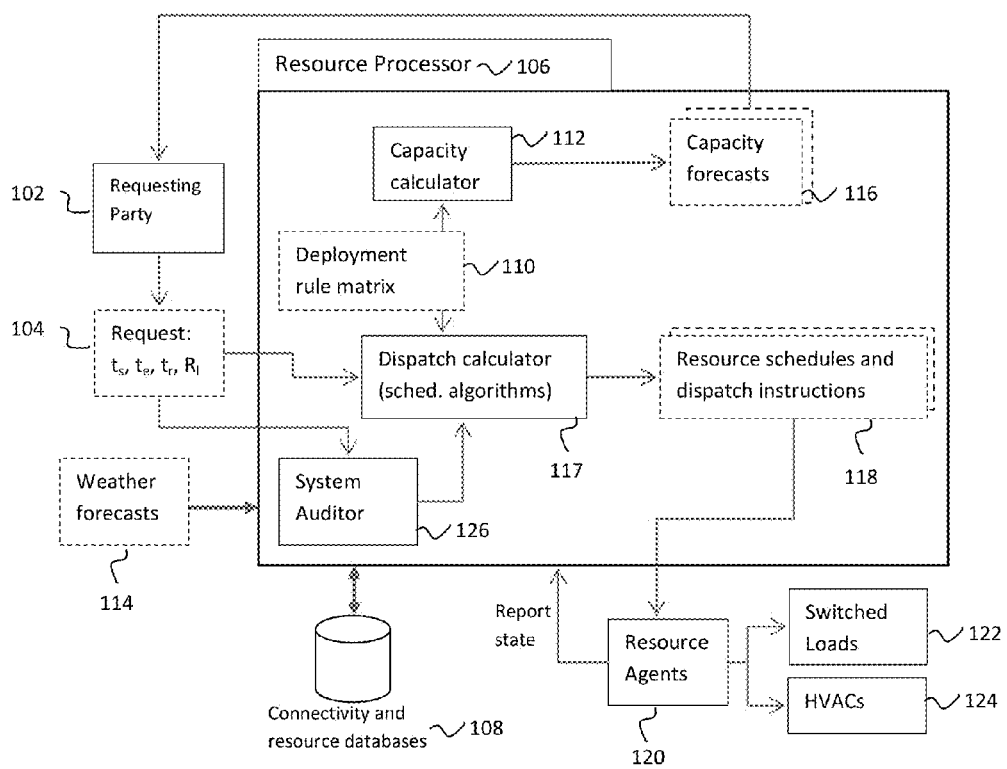
FIG. 1 is a schematic illustrating an overview of the components contributing to the process of scheduling resources to satisfy a request.

FIG. 1 is a schematic overview 100 of the components contributing to the process of scheduling resources to satisfy a request. A request generator such as a utility or other entity 102 knowing the total aggregated resource load it has under control as a function of time and temperature, issues a request 104, which may include the intent to shed a desired load from the electrical grid at a given time and duration. The request enters the resource processor 106 where algorithms generate unique schedules and instructions to control from one to many resources as may be needed to satisfy the request, and are available and under management of the entire system. The resource processor may also have electrical connectivity, normal operating characteristics of the resources and other inputs or databases 108 to determine applicable resources by geographic location, type and distribution network connection, which may be required to fulfill the request. Furthermore, the resource processor has a deployment rule matrix 110 to define rules and constraints on how and when resources can be used to satisfy a request.

The capacity calculator 112, weather forecasts 114 and given inputs are used to calculate the available capacity at any point in time, including forecasts of capacity 116 at a future time. The requesting party may also view and select the available resources and initiate resource instructions. When appropriate, the scheduling algorithm or dispatch calculator 117 will create resource instructions, commonly called a dispatch 118 and send them to resource agents 120. The resource agents 120 are located at the premise of the consumer of resource and are used to control switched loads 122, such as lighting, and heating, ventilation and air conditioning (HVAC) units 124.

A system auditor 126 runs independently from the resource processor and acts to ensure that the request is successfully met by the aggregated resources. This system monitors the activity at each resource agent, individual resource feedback, building level feedback, user opt-out events and other indicators, and reacts to reschedule additional resources to meet the request.

Figure 2:
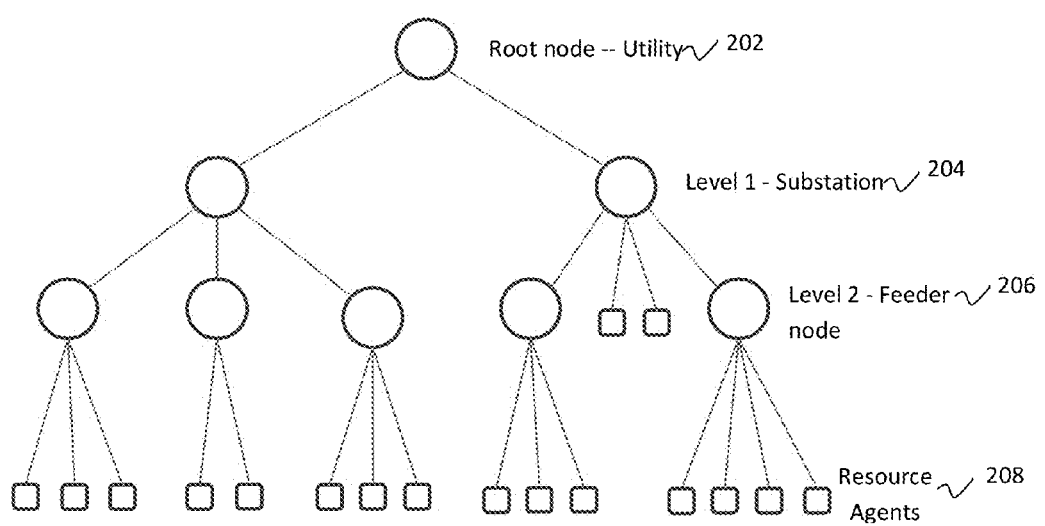
FIG. 2 is an illustration showing a hierarchical tree structure of connectivity for a typical electrical grid system. Many other network models exist and are also applicable to the claims.

FIG. 2 is an illustration showing a hierarchical tree structure of connectivity for a typical electrical grid system. Many other network models exist and are also applicable to the claims, including one-to-one, one-to-many, many-to-many, and many-to-one network connections. Nodes in the system may include the root utility node 202 connected to multiple substation nodes 204, each substation node may be connected to multiple feeder nodes 206, and each feeder node may be connected to multiple consumer sites, loads, distributed energy resources, and resource agents with communication and processing capabilities 208. This construct may be typical but is not rigidly defined; each electrical grid may be defined by different connectivity or operating definitions.

The resource agent is a combination of communication and processor as a computer system, which may operate autonomously and as an integral part to the entire system, and typically provides for control of one or many resources. The resource agent may have two-way communications with a resource processor, to enable reporting on the state of the resources and to receive instructions to manage the resources.

The geographical distribution of the resource agents provides for management of the resources such that their associated data is flexible and efficient. Furthermore, precise control based upon geographically located resources or electrical connection to a particular node is possible.

The process of controlling the operation of resources to achieve grid optimization or other purposes such as phase balancing may be governed by a set of deployment rules, decision trees, or other means of criteria which may be arranged in a table, matrix or array, herein called the deployment rule matrix. Where a resource model defines the operating instructions and the predictive state of a resource, a deployment rule defines the constraints on how the resource is dispatched.

Deployment rules may specify a number of constraints such as the duration of time the resource can be dispatched. The dispatch duration may be measured in minutes, for example, 10, 15, 30, 60, 120, and 180 minutes long. Another constraint may include a rest period. A rest period is length of time after a dispatch request in which a resource cannot be used again. The rest period may be used to retain the environment conditions at a premise or to govern the use of resources such as HVAC units that require a restoration period.

The maximum number of dispatch events allowed over any period of time, such as a day or as may be defined by consumer requirements, or the maximum HVAC set point changes in degrees Fahrenheit may also be constrained.

Figures 3, 4:
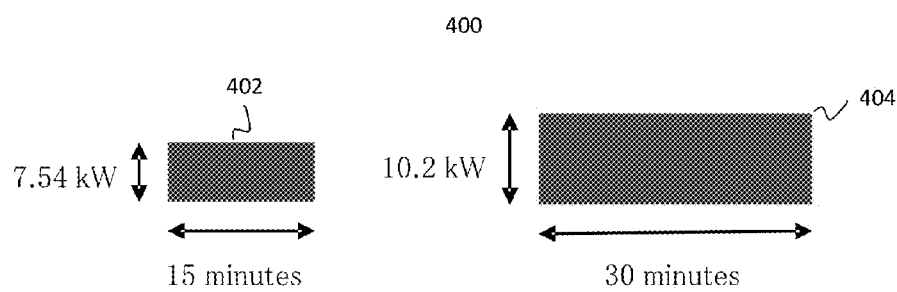
FIG. 3 illustrates an example deployment rule matrix showing the allocation of resources to different categories and allowable dispatch durations.
FIG. 4 is a geometrical representation of an available resource for dispatch defined by two different example resources.

FIG. 3 illustrates an example deployment rule matrix 300 showing one means of allocating resources to different categories and durations. In the example, switched load (S/L) resources 1 through 9 and HVAC units 1 through 4 are assigned to deployment rules.

Resources may be allocated to different deployment rules as defined in the deployment rule matrix. The rows of the deployment rule matrix may define a selectable product type and may be organized by impact on a consumer. The organization of the deployment rule matrix may be dynamic or predefined. The columns of the deployment rule matrix may define the time allotted to or allowable for dispatching those resources. Deployment rules may be given a ranking which may increase with dispatch duration, resource selection, or both. The deployment rule matrix may also reflect the terms and conditions of a contractual agreement with a consumer or resource and be aggregated over many such premises to define overall resource availability.

Resources may be assigned to one or many deployment rules and may be organized to be managed by deployment rule rank allowing scheduler algorithms to choose between resources based on many criteria. Different types of resources may be facilitated by deployment rule constraints as their models dictate. For example, HVAC units may have the additional constraint of allowable set point change which varies not only by time of day, but by product type or other consumer interests.

The type and behavior of the resources or electrical loads are defined by resource models. The models may be used to calculate the time and temperature dependent load for a resource. The resource model, $M_r$ may be:

$$M_r = M(t,T)$$

where t is time and T is temperature.

In addition to temperature and time dependent models, instructions are used to control each resource unit and may be additionally defined. By way of example, two resource models, switched loads and HVAC units, are described. Additional models are possible. New models may be added into the system via a plug and play interface, as each model is an implementation of an abstract class of models.

The load calculated from the resource model, $M_r$, is used in the scheduling algorithms and capacity calculations. A resource instruction can be drawn schematically as a brick with its vertical dimension representing the resource load in kW, and the horizontal dimension representing the duration. The length and multiplicity of the bricks is determined by the deployment rules and resource dependent constraints.

FIG. 4 is a geometrical representation of a request defined by two different example resource instructions. The height of the brick is the resource under control in kW and the length of the brick is the requested duration in minutes. The first brick 402 has a load of 7.54 kW and duration of 15 minutes. The second brick 404 has a load of 10.2 kW and duration of 30 minutes.

Figure 5:
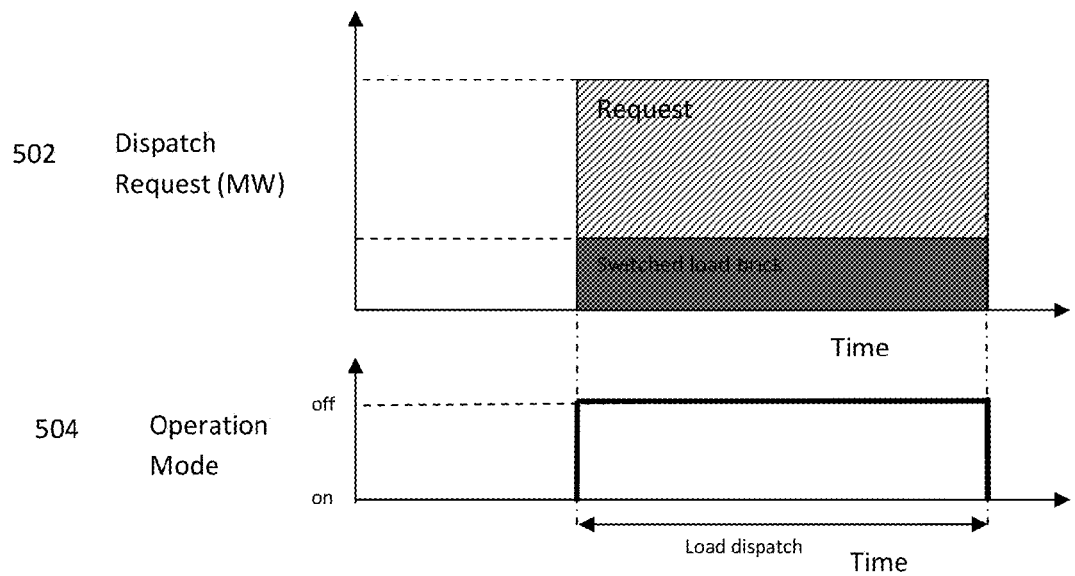
FIG. 5 is a plot illustrating a switched load model with a dispatch request and the model operation mode.

FIG. 5 is a plot 500 illustrating a dispatch request 502 and an example operation mode 504. The example operation mode represents a load as a constant value and has two states: either on or off. In the on state the resource is assumed to be consuming energy, e.g. a circuit breaker is closed. The on state represents resource power consumption and the off state represents no resource power consumption. While set to off, the switched load resource is contributing to the overall request. The size of brick 506 is governed by a survey of available resources for the dispatch duration. Time dependence may be governed by the deployment rule constraints.

The switched load model function may be a constant value representing the surveyed power consumption:

$$M(t,T) = S_L = \text{const}$$

Figure 6:
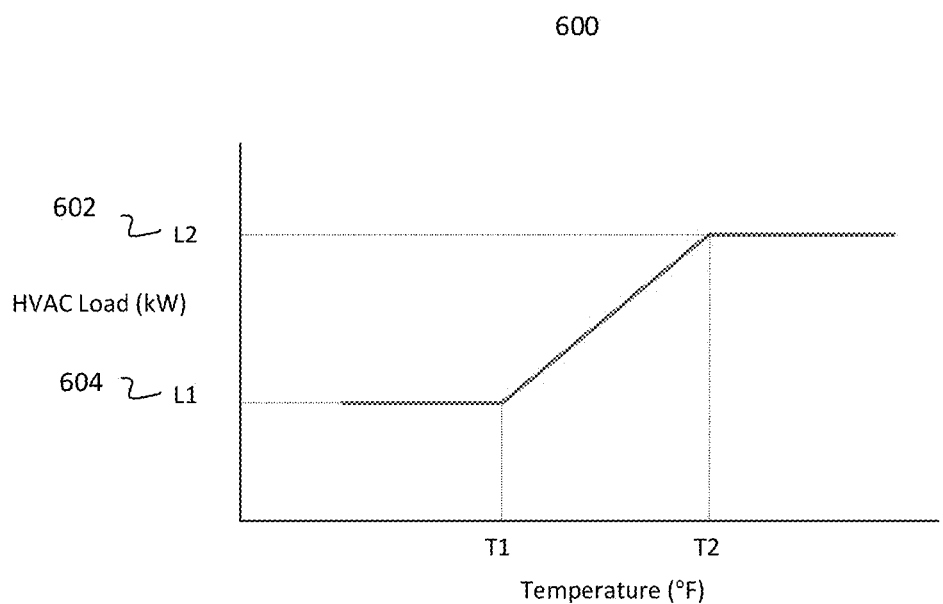
FIG. 6 is a plot illustrating the typical and variable relationship between HVAC cooling capacity and temperature, converted to a load approximation.

The example HVAC models have two temperature dependent components. The first is the model which calculates the effective electrical load of the HVAC unit as a function of temperature. FIG. 6 is a plot 600 illustrating the typical and variable relationship between HVAC cooling capacity and temperature, converted to a load approximation.

An HVAC unit can be represented as a variable amount of load which rises with increasing ambient temperatures. The HVAC units have a maximum load 602 at which point it remains constant with further temperature rise and a minimum operational load 604. A linear relationship is used as example for the variable load. Each HVAC unit has the load parameters $L_1$, $L_2$ in kW and $T_1$, $T_2$ in units of ° F.

$$L_{HVAC} = \begin{cases} L_1, & \text{if } T \leq T_1 \\ \left(\dfrac{L_2 - L_1}{T_2 - T_1}\right) \cdot T, & \text{if } T_1 \leq T \geq T_2 \\ L_2, & \text{if } T \geq T_2 \end{cases}$$

The second temperature dependent model component is a description of how a building or HVAC zone responds as a thermal load to changes in thermostat set points. Each HVAC zone has its own properties which affect its ability to hold a thermal load. Zones which perform well will respond slowly to a change in thermostat set point which in turn allows the HVAC unit, if selected as a resource with capacity, to accept a resource instruction with a longer duration. Poorly performing zones will rapidly gain heat requiring HVAC units to return to normal operation and maintain temperature at the new setting.

Figure 7A:
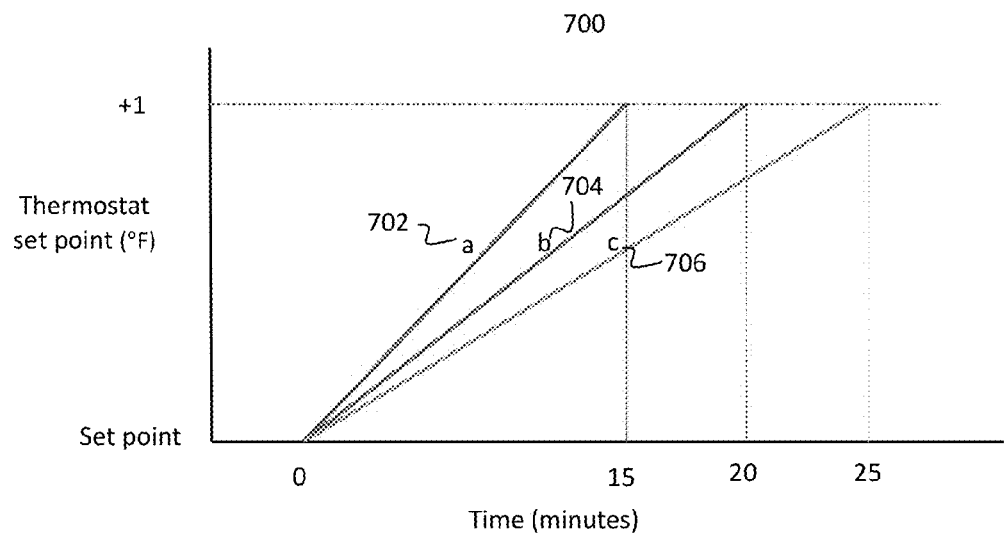
FIG. 7A is a plot illustrating the temperature response over time of an HVAC zone, conditioned space within a building when a change in thermostat set point is increased by 1° F.

FIG. 7A is a plot 700 illustrating the temperature response of an HVAC change, typically serving a zone within a building, to a change in thermostat set point by 1° F. The HVAC zone 702 responds poorly; in 15 minutes the temperature rises to the new set point indicating poor thermal isolation or other characteristic of the area served by this particular HVAC unit within the physical building. Zone 706 responds better as it is able to maintain the original temperatures and reaches the new set point in 25 minutes. FIG. 7A does not illustrate the oscillating or overshoot nature of the zone's temperature due to the HVAC unit and its control algorithms.

The response rate for an HVAC zone, $R_{HZ}(T)$, can be modeled directly from observational analysis of its performance during characterization events. The characterization events can be programmed to occur over a wide range of ambient temperatures thereby ensuring a representative set of observations. These observations are tabulated, analyzed statistically, and can be used to form arbitrary response rate functions (e.g., such as linear or non-linear models) or look up tables.

Figure 7B:
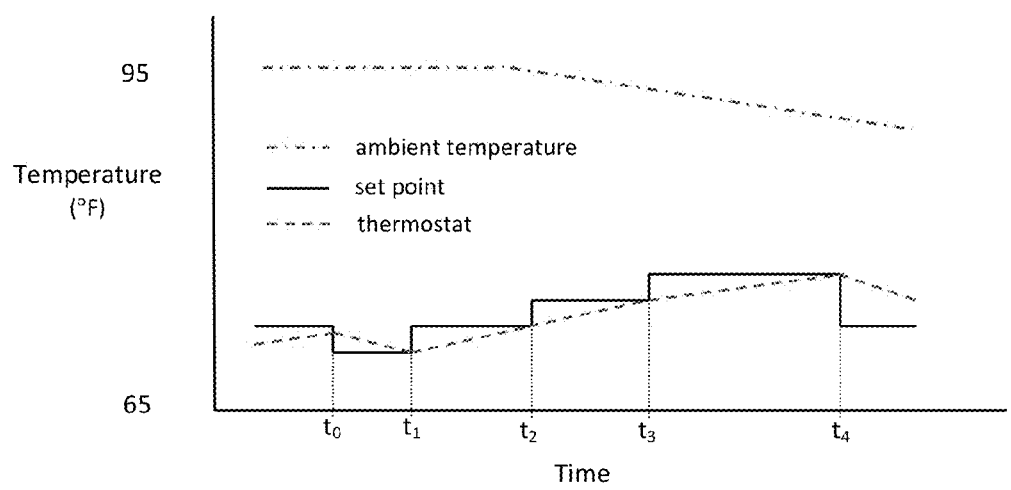
FIG. 7B is a schematic representation of a HVAC characterization event demonstrating set point changes based upon thermostat temperature readings.

FIG. 7B is a schematic description of a representative characterization event. These events take the form of controlled HVAC set points changes; though not preprogrammed as in a dispatch request, but controlled via active monitoring of the HVAC units and their thermostat temperature readings. In FIG. 7B, instructions are sent at each labeled time (i.e., $t_0$, $t_1$, $t_2$, $t_3$, and $t_4$). At $t_0$, the set point temperature is dropped 1° F. in order to get the HVAC unit to a known state. The thermostat temperature is monitored until it reaches this set point value at $t_1$. The set point is raised 1° F. and subsequent times, $t_1$, $t_2$, $t_3$ and the delta between these points is used to calculate the response rate at the associated ambient temperature. FIG. 7B illustrates a longer response time between $t_3$ and $t_4$ as the ambient temperature dropped. To complete the test and restore the building environment, the set point is reset to the original state at $t_4$.

Figure 7C:
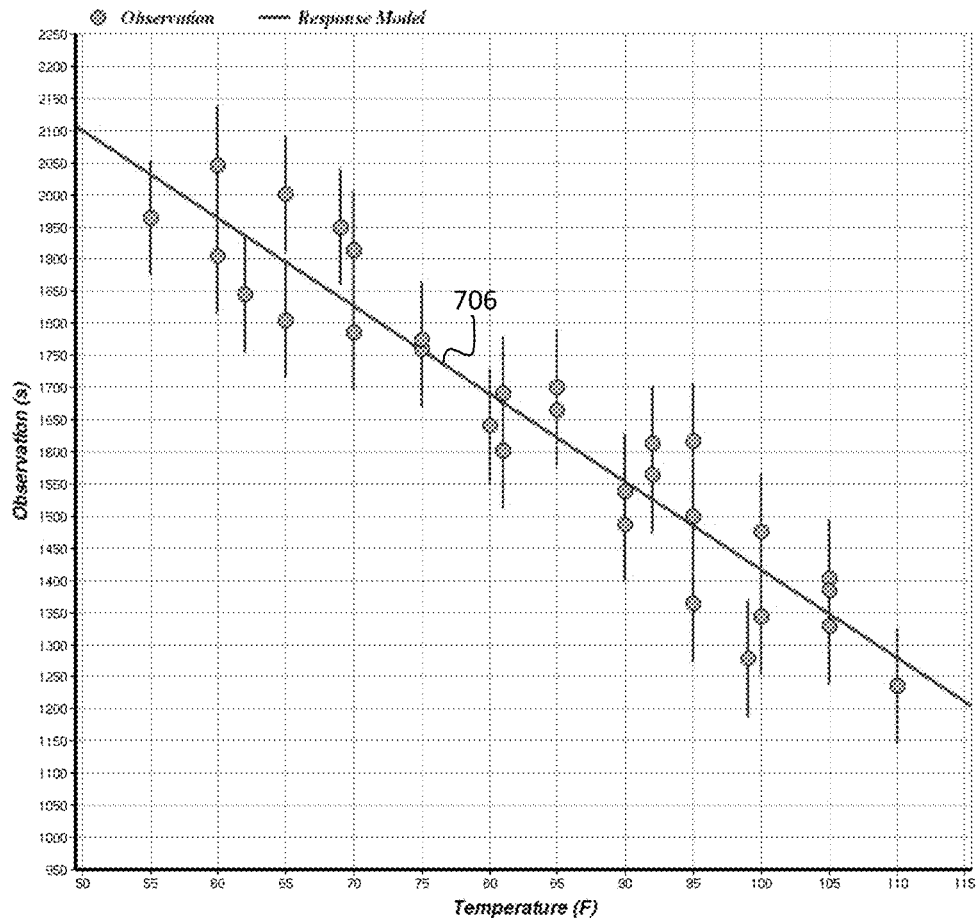
FIG. 7C is a plot illustrating the collection of observations used for statistical calculations of HVAC response models.

FIG. 7C is a plot illustrating data collected for a complete building characterization over 10 events and 30 different observations. In FIG. 7C, $R_{HZ}(T)$ has been calculated as a linear fit to the observed data collected for the zone. The response rate as a function of temperature can be described as:

$$R_{HZ}(T) = m_{HZ} \cdot T - b_{HZ}$$

where $m_{HZ}$ and $b_{HZ}$ are HVAC zone specific parameters describing the linear relationship with temperature. The response model line 708 in FIG. 7C represents a best fit model from which the response parameters are calculated.

In many cases, multiple HVAC units can be managed as a group as they effectively service a single zone. This enables the control over the HVAC load consumption more effectively as a percentage of units can be given one resource instruction for any duration while the remaining units are expected to continue running. The load model for each unit is still applicable to each unit in an HVAC zone, however, the assumption can be made that $R_{HZ}(T)$ for selected units is sufficiently large to allow for continuous dispatch while the others are left alone to operate. HVAC groups can be similarly characterized as the individual units described above. Active monitoring and characterization assure confidence in the HVAC groups' performance and ultimate dispatch reliability.

The choice of HVAC units within the resource processor may also be constrained by any fixed parameter such as the zone's temperature rise if restricted to a specified change in temperature over time, such as 1° F. every 20 minutes, or other similar restriction. The combination of constraints and natural operating characteristics of a resource will affect the decisions by the resource processor and many limit resource instructions, such as on poorly performing HVAC zones as the temperature rises quickly and the unit may restart operation.

Dispatching HVAC loads can take advantage of a precooling phase if the resource processor is permitted within the deployment rule matrix to drop the temperature of a zone before starting the load dispatch.

Figure 8:
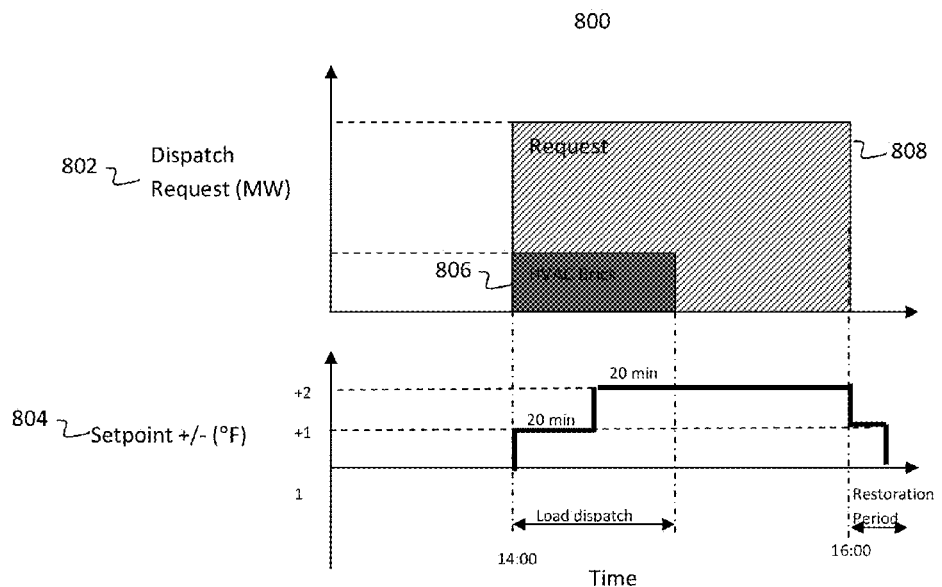
FIG. 8 is a plot illustrating the deployment of HVAC resources.
Figure 9:
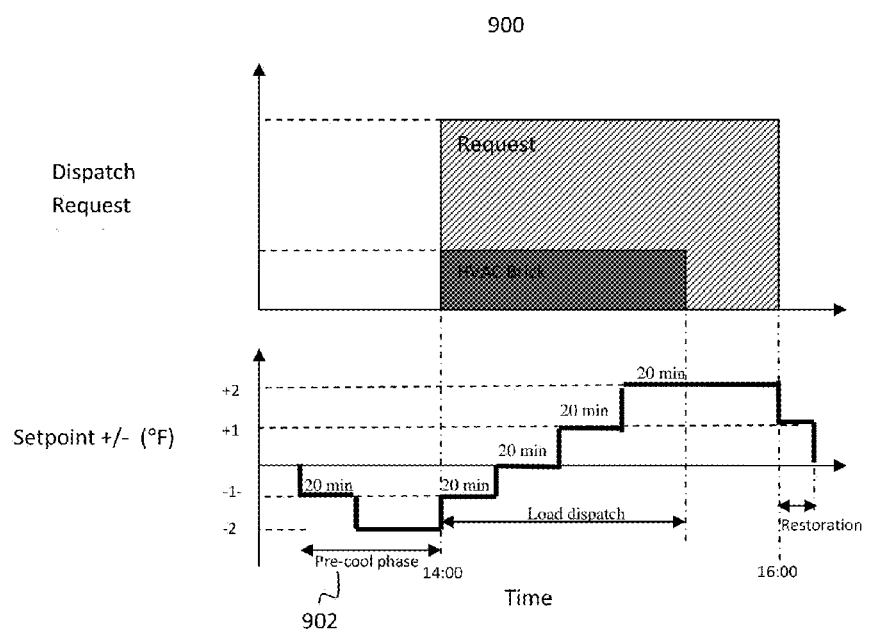
FIG. 9 is a plot illustrating the deployment of HVAC resources with a pre-cooling phase, the option of initiating a request to operate followed by a request to stop operation.
Figure 10:
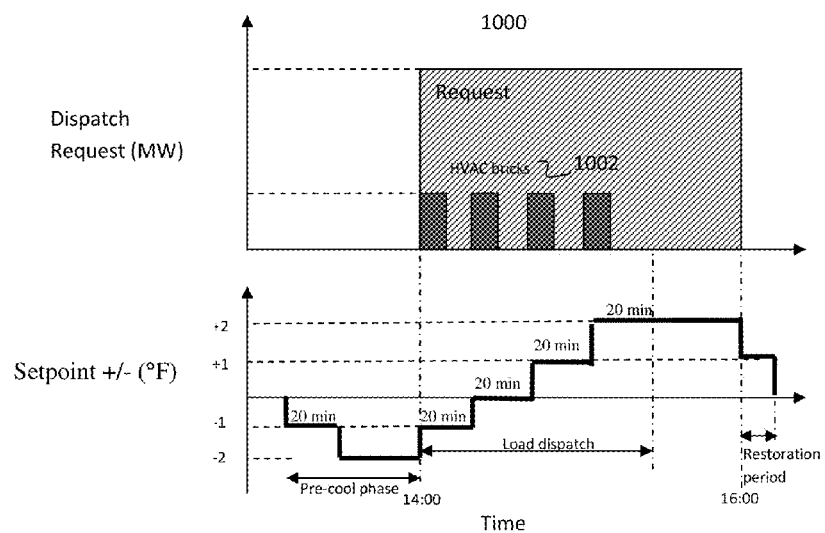
FIG. 10 is a plot illustrating the deployment of HVAC resources additionally showing the effect on total dispatched load for poorly performing HVAC zones.

The different modes of dispatching HVAC units are depicted schematically in the FIG. 8 through 10. In each FIG., the HVAC brick depicts the time and load and is displayed as a part of a total request.

FIG. 8 is a plot 800 illustrating the deployment of HVAC resources. The top graph 802 shows the total requested profile lasting two hours from 14:00 to 16:00. The contributing HVAC brick 806 is shown inside the request profile 808. The HVAC brick in this example is defined by a 2° F. rise in set point in 1° F. increments, each lasting 20 minutes. The set point remains at this elevated temperature until the requested dispatch ends at which point the thermostat is restored to normal state.

FIG. 9 is a plot 900 illustrating the deployment of HVAC resources with a pre-cooling phase. The pre-cooling 902 occurs before the event starts and places the zone in a state allowing greater temperature rise and thus longer duration within the resource instruction, in this case 80 minutes total duration.

FIG. 10 is a plot 1000 illustrating the deployment of HVAC resources additionally showing the effect on the total request for poorly performing HVAC zones. Assuming, due to building environment constraints, the temperature cannot be raised too quickly, the HVAC will cause gaps between the HVAC brick 1002. HVAC zones that perform poorly may not shed their load for the minimum 20 minute period and allow for a thermostat set point increase. Thus the bricks defining the shed load are discontinuous.

Capacity may be defined as the sum of resource loads available to accept a resource instruction and may be constrained by deployment rule, time, and temperature. Capacity may be calculated and stored for each node of the connectivity model as the total aggregated electrical load. The data can be further refined based upon other properties such as phase and resource type. While individual loads are represented schematically as a brick, capacity can be represented as a profile defined by the summation of all contributing bricks.

Capacity can be presented in terms of product, selected resources, and time. For a given product and collection of resources, r, the capacity available may be calculated as a function of time, $C(t)$:

$$C(t) = \left[ \sum_r L_r(T, t, dr) \cdot d_{dr} \cdot f_r(d_R, dr) \right] \cdot d_R^{-1}$$

where $L_r$ is the load on each resource, $d_{dr}$ is the duration defined by the deployment rule, $f_r$ is the frequency and indicates how often a resource can accept a resource instruction within the request period and includes rest periods, and $d_R$ is the duration for the request. $L_r$ may be given by the relationship:

$$L_r(T, t, dr) = M_r(t, T, dr) \cdot \delta_S \delta_H(t)$$

The model function $M_r$ is as described above. $\delta_s(t)$ is a delta function (i.e. has the value of 0 or 1) and may be determined by the near term time dependent scheduled instruction for the resource. This data may contain information on the scheduled instructions that may interact with processing of a new request. These schedules may affect the availability of a resource due to execution status, rest periods and deployment rule matrix durations. The scheduled events can be redeployed if they are processed sufficiently well ahead of execution.

$\delta_H(t)$ is a delta function (i.e. has the value of 0 or 1) based upon the resource's allocation history. This function is 0 if the resource is no longer available or 1 if it is available or components are available.

Figure 11:
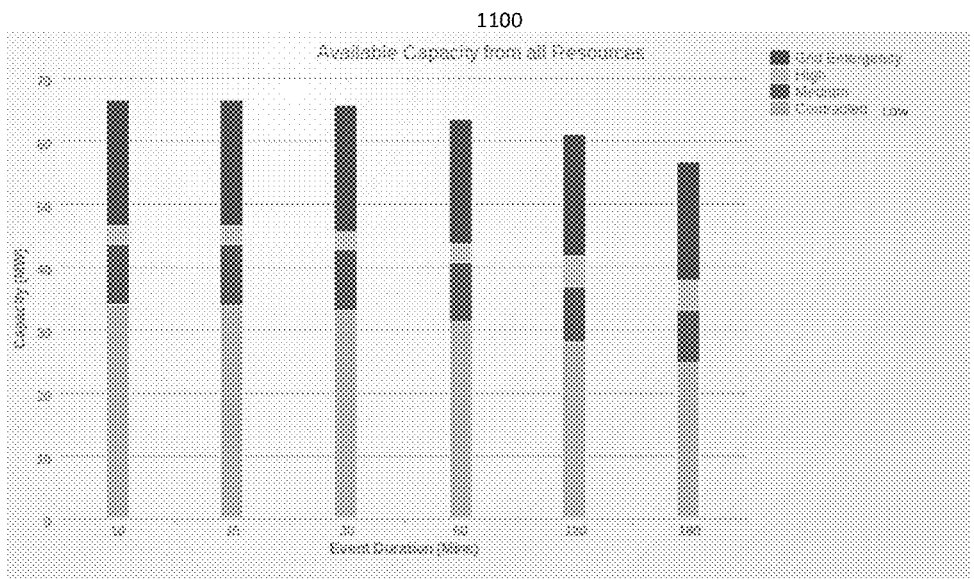
FIG. 11 is a bar chart illustrating a means of presentation for available capacity from a selected portfolio or all resources at a given instant in time.

The algorithm for capacity calculation may be as follows:
1) For each node in the connectivity model
   a) Collect current and future temperature data
   b) Select resources by local connectivity model and availability
      i) Resources with scheduling conflicts are removed
      ii) Add unique resources from deployment rules of lesser rank
   c) Integrate resource loads through dispatch time
   d) If resource is HVAC then
      i) If pre-cooling process requested and dispatch request starts at time>2 hours from now then
         (1) Calculate $t_d$ (deployment time) and $t_r$ (restoration time) for resource assuming pre-cooling
      ii) Else
         (1) calculate $t_d$ (deployment time) and $t_r$ (restoration time) for resource based upon deployment rule set point shift
      iii) end
   e) Multiply integrated resource load by allowable repeat dispatches
   f) Divide integrated resource values by dispatch duration to get capacity
   g) Aggregate resources on lower level connectivity model nodes
2) Store aggregated results and resource allocation schedules in databases FIG. 11 is a bar chart 1100 illustrating a means for presentation for available capacity from a selected portfolio or all resources at a given instant in time. Each bar represents the capacity available for the specified duration of time. In this example, the dispatch times range from 10 minutes to 3 hours. The magnitude of each bar is the sum of all available resources which is divided by color according to the products in the example deployment rule matrix.

The scheduling algorithm may be responsible for meeting a dispatch request by: selecting the appropriate resources; preparing HVAC zones for pre-cooling phase if requested and allowable; generating resource instructions; ensuring the requested instructions are met; and ensuring ramping schedules are applied.

The scheduling algorithm may be launched by receiving a request which may include parameters such as start and stop time, ramping time, location and a capacity.

Figure 12:
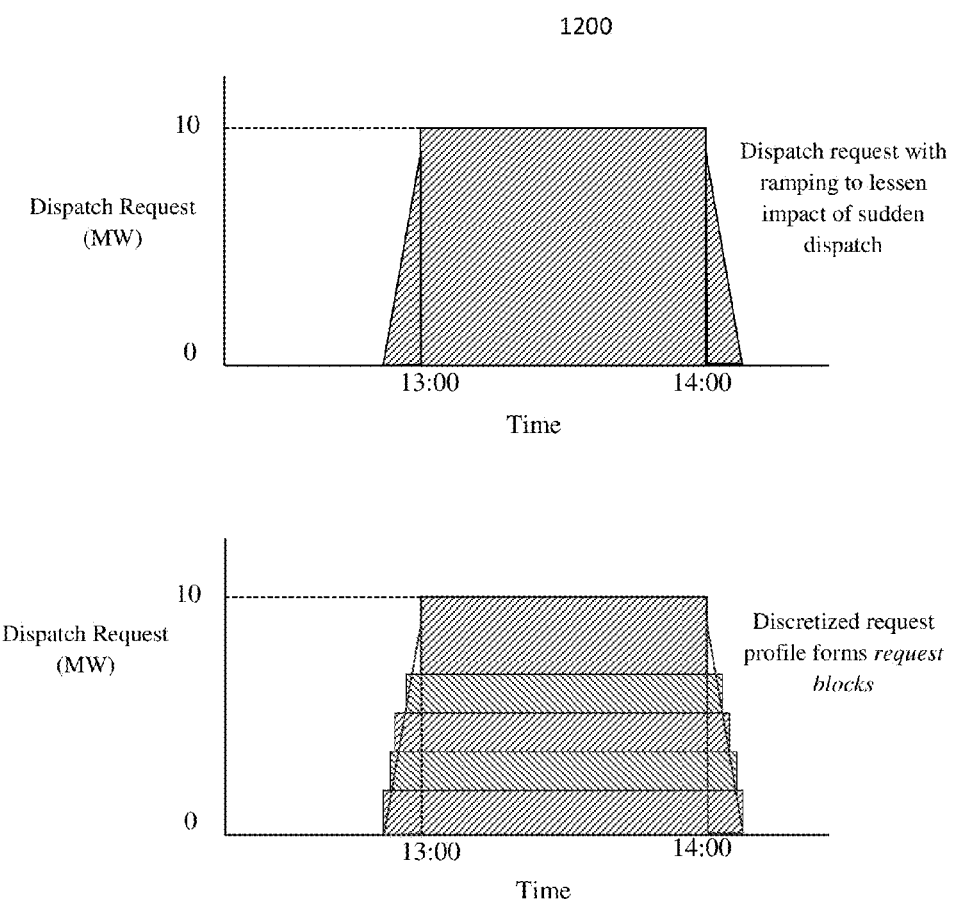
FIG. 12 is a plot illustrating a dispatch request for 10 MW for 1 hour with a four minute ramp up and four minute ramp down.

FIG. 12 is a plot 1200 illustrating a load request for 10 MW for 1 hour with a four minute ramp up and four minute ramp down. These parameters can include, $t_{start}$, $t_{end}$, $t_{ramp}$, and $R_l$. The ramping schedule can be a linear increase from zero to 75% of full requested dispatch in the time, $t_{ramp}$. This ramping stage and all non-rectangular dispatch profiles are discretized into request blocks. A complete set of request blocks form a request profile and can be processed separately and sequentially.

The process of scheduling resources to meet a request may be reduced to solving for each of the request blocks. A request block may be satisfied by accumulating resource bricks into a dynamic profile. Resource bricks can be added to the profile such that the profile grows uniformly on both the time and load allocation. The placement of resource bricks may define the instructions created by the resource class implementation.

Figure 13:
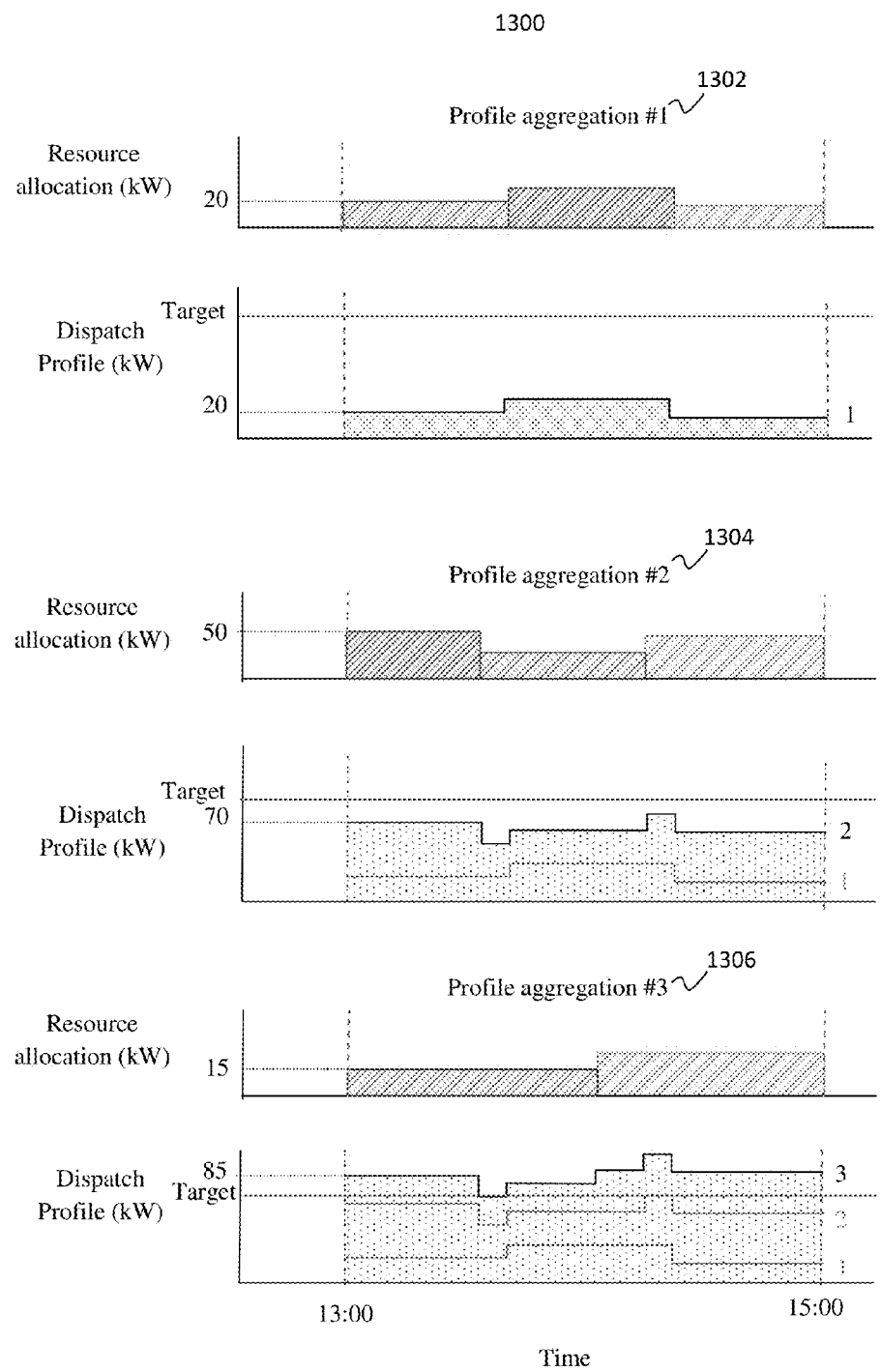
FIG. 13 is a plot illustrating the progression of a profile as resource bricks are selected for dispatch and added into the profile.

FIG. 13 is a plot 1300 illustrating the progression of a profile as resource bricks are selected and added into the profile. In subplot 1302 the first bricks are selected and the profile is simply the surface contour of the bricks aligned in time across the request. The height of the profile increases as subsequent bricks are added from a nominal value of 20 kW indicated in 1302 to 70 kW in 1304 and finally 85 kW in 1306. The profiles are formed by the aggregations of resources to satisfy requests.

An example scheduling algorithm for a single request block is described below. To determine the placement of a block, the aggregated profile may be searched from right to left (the end of the request time, $t_E$ to the start of the request time $t_S$) to find non-uniformities within tolerance or the start of the block. The type of block chosen to be placed comes from a set of collections based upon the deployment duration of the resource and type of resource. Switch loads can have some flexibility in the allotted time for dispatch while HVAC resources have variable dispatch durations and constraints as described herein.

The typical sets of collections can include: a set of resources whose available duration is the same as the deployment rule and dispatch request duration (for example, a switched load that can be turned off for the full 60 minutes of a 60 minute shed request); a set of HVAC resources whose available duration is shorter than the request duration; a set of HVAC resources whose effective capacity are shorter than the 20 minutes resulting in gaps in dispatch; a set of resources from lower ranking deployment rules which can contribute to fulfilling the requested dispatch; and a set of HVAC groups who are operated collectively to fulfill the entire request duration.

The scheduling algorithm for HVAC resources is complicated by the arbitrary nature of the each unit's performance. The algorithm is required to dispatch a very large set of units efficiently and uniformly. An example HVAC resources scheduling algorithm for a single request block may be:
1. Let $t_S$ be the start time of the request
2. Select all contributing resources by connectivity model and availability
3. Order resources by dispatch duration
4. Pair resources whose sum of dispatch durations are nearly equal to the request duration. Resources with longer dispatch durations remain unpaired.
5. Repeat
   a. Select resource or resource pair
   b. If resource pair: add resource to profile at $t_S$, add second resource at $t_S+d_1$ where $d_1$ is the dispatch duration of the first resource.
   c. If single resource:
      i. If $d_1$>request duration add resource to profile at $t_S$
      ii. else place resource at profile minimum
6. Until request block is satisfied; the value of the profile for all time is greater than the request block's magnitude The system auditor may be responsible for the monitoring and modifying of resource instructions to achieve an overall balanced capacity to satisfy a request. During a request, many hundreds or thousands of individual switched load and HVAC units may be called upon to contribute. Events may occur that reduce the actual contribution made by any individual selected resource. For example, a building manager may opt-out of an event thus effectively removing the resources from the availability pool. Another example is the discrepancy between actual capacity and predicted (and scheduled) capacity due to weather related risks. As many resources are temperature dependent, their contributions may need to be supported by adding additional resources to the dispatch. It may be the role of the system auditor to ensure the requested dispatch and actual capacity are equal and consistent.

The system auditor may have a number of components working together to ensure a successful dispatch.

Resource monitoring may be done at each resource agent. A determination is made whether the resource agent and any of its resources are contributing to an active request. If the resources are contributing, the monitors evaluate the real-time performance and compare it to the expected behavior. For example, assume a single HVAC unit has been given the resource instruction duration of 30 minutes. However, due to an unacceptable temperature rise or other site specific condition, the resource was only available for 20 minutes; a 10 minute difference. It may be expected that the second dispatch brick will also be shortened by this same amount. In total, this unit underperforms by 20 minutes in the 1 hour request.

Figure 14:
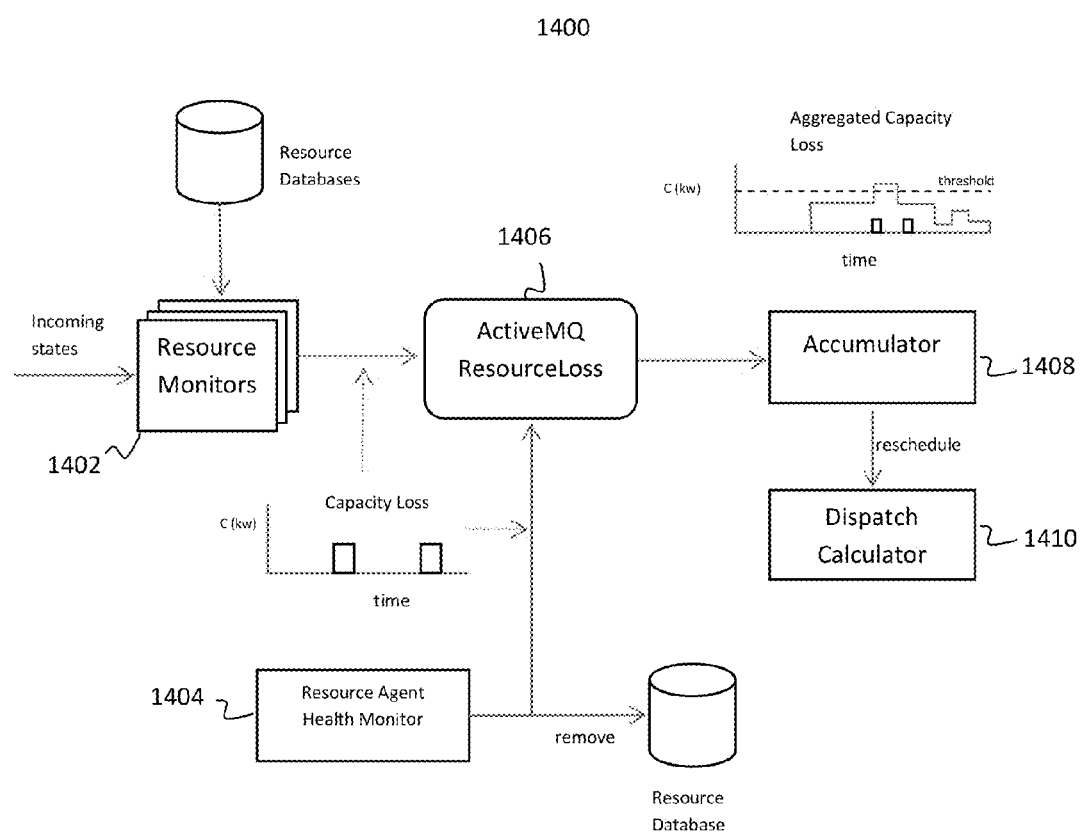
FIG. 14 is a diagram of the components of a system auditor.

FIG. 14 is a diagram 1400 of the components of a system auditor and includes resource monitors 1402, a resource agent health monitor 1404, a message queue for receiving Resource Loss 1406, an accumulator 1408 and the dispatch calculator 1410.

Resource monitors 1402 may perform the following duties:
1) Get the expected performance for each resource. These are stored in the database as a deployment profile and for HVACs a set point profile.
2) If the reported and expected states match, continue
3) If there is a discrepancy between actual state and expected state (first time)
   a) Create a Resource Loss profile.
   b) Set an indicator on the resource agent resource in the database to track states
   c) Send the capacity loss profile to the ResourceLoss queue.

The ResourceLoss 1406 queue can be the deposit location for messages indicating discrepancies between expected and actual resource performance. The messages may originate from multiple sources such as resource monitors, resource agent health monitors, which track the behavior of each resource agent for anomalies such as poor or lost communications, or building override (opt-out) signals. Each source may send resource loss messages to this queue as predefined formatted strings.

The Accumulator 1408 may consume messages indicating reduced capacity from the ResourceLoss queue, aggregate this lost capacity and make decisions on when and how to reschedule additional resources. The aggregation of lost resources can reduce the number of necessary rescheduling calls. Consider for example, a single underperforming HVAC unit is no cause for schedule change, however, the aggregation of many underperforming HVAC units, lost switched loads or other resources due to temperature changes and building overrides, etc. may have an impact on the total request. Thus the sum of the individual underperforming contributions, also represented as a brick and profile, can be continually monitored during a request. If the lost capacity grows to a magnitude deemed too large, an engagement of additional resources can be requested using the lost capacity envelop profile as the new resource instruction.

The Accumulator may run as a daemon and message queue consumer.

The Accumulator can:
1) Initiate accumulation based upon request ID.
2) consume messages on the ResourceLoss queue regardless of source
3) sum the capacity loss profile into the aggregated capacity loss profile for the present dispatch
4) if the magnitude of the aggregated capacity loss is above a threshold
   a) call a point reschedule operation from the Resource Processor with the necessary profile change.
   b) send a Notification of type "PointReschedule"
   c) reset aggregated capacity loss profile
5) End accumulation for a given request ID.

Figure 15:
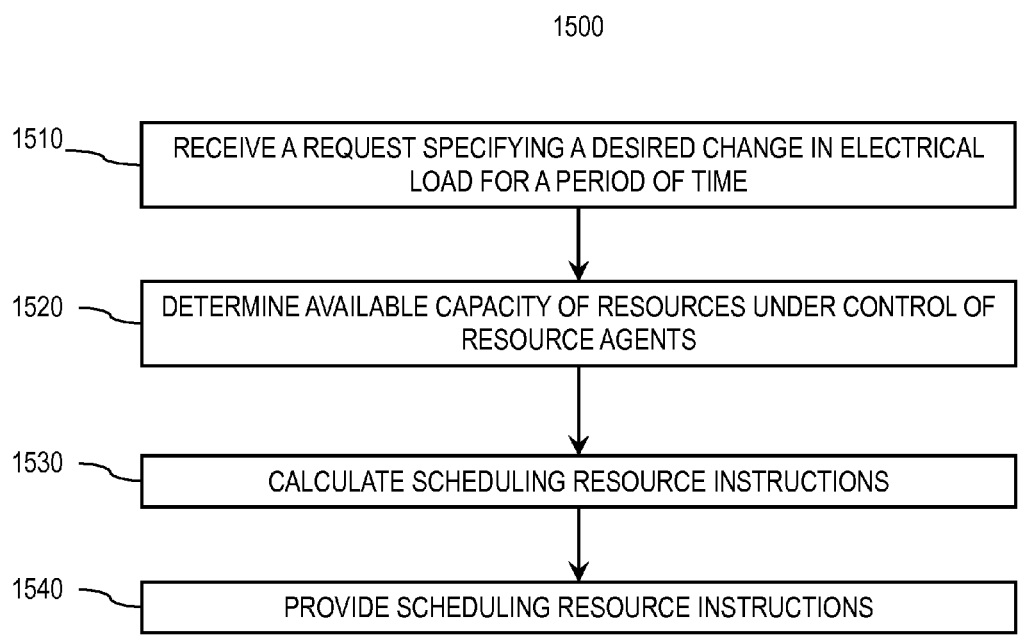
FIG. 15 is a process flow diagram illustrating a method of providing resource scheduling instructions.

FIG. 15 is a process flow diagram illustrating a method 1500 of providing resource scheduling instructions. A request is received at 1510 specifying a desired change in electrical load for a defined period of time. The electrical load is associated with resources under control of a resource agent on a utility grid. The request can be from a utility or other interested entity. The available capacity of the resources is determined at 1520. The capacity can be determined using a resource load model. The available capacity is used to calculate, at 1530, resource scheduling instructions. The resource scheduling instructions will instruct a subset of the resources to reduce their electrical load for some time in order to satisfy the request. The resource scheduling instructions are provided at 1540.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more data processors, the method comprising:
    receiving, by the one or more data processors, data comprising a request specifying a desired change in electrical load for a defined period of time, the electrical load associated with a plurality of resources under control of resource agents and on a utility grid;
    determining, using the one or more data processors, available capacity of resources within the control of each resource agent over the defined period of time by accessing at least one data source comprising predefined parameterized load models;
    calculating, using the one or more data processors and the determined available capacity of resources over the defined period of time, resource scheduling instructions for a subset of resources, the resource scheduling instructions satisfying the desired change in electrical load of the request;
    providing, using the one or more data processors, data characterizing the resource scheduling instructions;
    receiving, from the resource agents, a plurality of messages indicating discrepancies between expected and actual resource performance;
    calculating, using the received messages, a lost capacity envelope characterizing an aggregate across resource agents of lost capacity, the lost capacity depending on a load on each resource, a duration defined by a deployment rule, and an indication of how often a respective resource can accept an instruction; and
    processing, when a sum of the discrepancies between expected and actual resource performance exceeds a predetermined magnitude, a second resource scheduling instruction specifying a desired change in electrical load according to the lost capacity envelope.

2. The method of claim 1, wherein the data characterizing the resource scheduling instructions is provided to resource agents in control of the subset of resources.

3. The method of claim 1, wherein the request is from a utility or other interested entity.

4. The method of claim 1, wherein determining available capacity is further based on a set of deployment rules, the set of deployment rules including one or more of: a duration a given resource may be dispatched, and a rest period of a given resource.

5. The method of claim 4, wherein the set of deployment rules reflects terms a resource manager has previously agreed to.

6. The method of claim 1, wherein resources are switched load resources.

7. The method of claim 1, wherein resources include at least one heating, ventilation, and air conditioning (HVAC) unit, and lighting.

8. The method of claim 1, wherein the resource load model predicts future load requirements for the given resource.

9. The method of claim 8, wherein the resource load model is dependent on one or more of time and temperature.

10. The method of claim 1, further comprising dynamically updating the load model based on data describing a state of the resource.

11. The method of claim 1, wherein the resource load model is based on past observations of the same or a similar resource.

12. The method of claim 1, wherein the resource load model is one of linear, non-linear, or stepwise discontinuous.

13. The method of claim 1, wherein a capacity of each resource is determined based on a load, duration of request, frequency of resource, and duration of deployment.

14. The method of claim 1, wherein the scheduling instructions include a precooling-phase instruction.

15. The method of claim 1, wherein the request includes data characterizing specific resources to be instructed.

16. The method of claim 1, wherein determining available capacity of resources is further based on at least a weather forecast.

17. The method of claim 1, further comprising: receiving feedback from one or more of the resource agent, a resource, a set of resources, or a user, and basing the calculation of the subset of resources and resource scheduling instructions on the received feedback.

18. A system comprising:
    at least one data processor;
    memory storing instructions which, when executed by at least one data rocessor, causes at least one data processor to perform operations comprising:
        receiving data comprising a request to reduce an electrical load on a utility grid for a defined period of time, the electrical load associated with a plurality of resources under control of resource agents;
        determining available capacities of resources over the defined period of time by accessing at least one data source comprising predefined parameterized resource load models;
        calculating, from the available capacity of each resource agent over the defined period of time, a subset of resources and resource scheduling instructions, the resource instructions satisfying the desired change in electrical load of the request;
        providing data comprising the resource scheduling instructions;
        receiving, from the resource agents, a plurality of messages indicating discrepancies between expected and actual resource performance;
        calculating, using the received messages, a lost capacity envelope characterizing an aggregate across resource agents of lost capacity, the lost capacity depending on a load on each resource, a duration defined by a deployment rule, and an indication of how often a respective resource can accept an instruction; and
        processing, when a sum of the discrepancies between expected and actual resource performance exceeds a predetermined magnitude, a second resource scheduling instruction specifying a desired change in electrical load according to the lost capacity envelope.

19. A non-transitory computer program product storing instructions, which when executed by at least one data processor of at least one computing system, implement a method according to:

receiving data comprising a request to reduce an electrical load on a utility grid for a defined period of time, the electrical load associated with a plurality of resources under control of resource agents;

determining available capacities of resources over the defined period of time by accessing at least one data source comprising predefined parameterized resource load models;

calculating, from the available capacity of each resource agent over the defined period of time, a subset of resources and resource scheduling instructions, the resource instructions satisfying the desired change in electrical load of the request;

providing data comprising the resource scheduling instructions;

receiving, from the resource agents, a plurality of messages indicating discrepancies between expected and actual resource performance;

calculating, using the received messages, a lost capacity envelope characterizing an aggregate across resource agents of lost capacity, the lost capacity depending on a load on each resource, a duration defined by a deployment rule, and an indication of how often a respective resource can accept an instruction; and processing, when a sum of the discrepancies between expected and actual resource performance exceeds a predetermined magnitude, a second resource scheduling instruction specifying a desired change in electrical load according to the lost capacity envelope.

* * * * *